(12) United States Patent
Fukuda et al.

(10) Patent No.: US 7,076,342 B2
(45) Date of Patent: Jul. 11, 2006

(54) ATTITUDE SENSING APPARATUS FOR DETERMINING THE ATTITUDE OF A MOBILE UNIT

(75) Inventors: Masaru Fukuda, Nishinomiya (JP); Hiroyuki Toda, Nishinomiya (JP)

(73) Assignee: Furuno Electric Company, ltd., Hyogo-ken (JP)

(*) Notice: Subject to any disclaimer, the term of this patent is extended or adjusted under 35 U.S.C. 154(b) by 46 days.

(21) Appl. No.: 10/800,698

(22) Filed: Mar. 16, 2004

(65) Prior Publication Data
US 2004/0176882 A1    Sep. 9, 2004

Related U.S. Application Data

(63) Continuation of application No. 10/438,915, filed on May 16, 2003, now abandoned.

(30) Foreign Application Priority Data

May 16, 2002   (JP)   ............................... 2002-141576

(51) Int. Cl.
  B64C 7/00   (2006.01)
  G05D 1/00   (2006.01)
  G05D 3/00   (2006.01)
  G06F 17/00  (2006.01)
  G06F 19/00  (2006.01)

(52) U.S. Cl. .................... 701/4; 701/200; 701/213; 701/214; 701/215; 701/216; 342/357.11; 342/357.14; 342/61; 342/62; 342/63; 342/73; 342/74; 244/3.2; 244/3.15; 244/3.16; 244/3.19; 244/3.21; 702/1

(58) Field of Classification Search .................. 701/4, 701/200, 213–216; 340/967; 342/357.11, 342/357.14, 61–63, 73–75; 244/3.2, 3.15, 244/3.16, 3.19, 3.21; 702/1
See application file for complete search history.

(56) References Cited

U.S. PATENT DOCUMENTS

| 5,692,707 A | * | 12/1997 | Smay ......................... 244/165 |
| 5,757,316 A |   | 5/1998  | Buchler |
| 6,095,945 A | * | 8/2000  | Graf ............................ 477/97 |
| 6,125,314 A | * | 9/2000  | Graf et al. ................... 701/53 |
| 6,240,367 B1 |  | 5/2001  | Lin |

(Continued)

OTHER PUBLICATIONS

Martin-Neira et al., Attitude Determination with GPS: Experimental Results, 1990, IEEE, p. 2-24-29.*

(Continued)

Primary Examiner—Thomas G. Black
Assistant Examiner—McDieunel Marc
(74) Attorney, Agent, or Firm—Birch, Stewart, Kolasch & Birch, LLP

(57) ABSTRACT

An attitude sensing apparatus for determining the attitude of a mobile unit is provided that can reliably estimate an alignment angle between a GPS antenna coordinate system and an IMU coordinate system with good accuracy regardless of the magnitude of the alignment angle. Based on observation of the difference between a GPS angular velocity and an IMU angular velocity, an alignment angle estimating section estimates an alignment angle and sensor errors. An alignment angle adder and a sensor error adder cumulatively add and update the estimated alignment angle and sensor errors, respectively. The estimated alignment angle is fed back to an inertia data converter while the estimated sensor errors are fed back to an inertia data correcting section. The apparatus repeatedly performs estimation until the estimated alignment angle gradually approaches a true alignment angle by successively feeding back estimated values to a flow of alignment angle estimation process.

21 Claims, 5 Drawing Sheets

U.S. PATENT DOCUMENTS

| | | |
|---|---|---|
| 6,341,249 B1 * | 1/2002 | Xing et al. .................... 701/13 |
| 6,408,245 B1 | 6/2002 | An et al. |
| 6,596,976 B1 * | 7/2003 | Lin et al. ...................... 244/3.2 |
| 6,684,143 B1 * | 1/2004 | Lauer et al. .................. 701/51 |
| 6,754,584 B1 * | 6/2004 | Pinto et al. ................. 701/215 |
| 2005/0004748 A1 * | 1/2005 | Pinto et al. ................. 701/200 |

OTHER PUBLICATIONS

Owen et al., Experimental analysis of the use of angle of arrival at an adaptive antenna array for location estimation, 1998, IEEE, p. 607-611.*

* cited by examiner

Antenna Coordinate System          IMU Coordinate System

ATTITUDE SENSING APPARATUS FOR DETERMINING THE ATTITUDE OF A MOBILE UNIT

CROSS-REFERENCE TO RELATED APPLICATIONS

This application is a continuing application of application Ser. No. 10/438,915, filed on May 16, 2003 now abandoned, the entire contents of which are hereby incorporated by reference and for which priority is claimed under 35 U.S.C. § 120; and this application claims priority of application Ser. No. 2002-141576 filed in Japan on May 16, 2002 under 35 U.S.C. § 119.

BACKGROUND OF THE INVENTION

1. Field of the Invention

The present invention relates to an integrated GPS/IMU attitude sensing apparatus for determining the attitude of a mobile unit by integrating attitude data derived from the global positioning system (GPS) and attitude data derived from an inertial measurement unit (IMU). The GPS-derived attitude and the IMU-derived attitude are hereinafter referred to as the GPS attitude and the IMU attitude, respectively. More particularly, the invention is concerned with an integrated GPS/IMU attitude sensing apparatus designed to reliably estimate an alignment angle for correcting misalignment between an antenna coordinate system and an IMU coordinate system.

2. Description of the Related Art

A GPS attitude sensing system is a known example of a system for determining the heading and attitude of a mobile unit. The conventional GPS attitude sensing system uses at least three GPS antennas which are installed on a rigid mobile unit and are not arranged in a line. The system receives radio signals from GPS satellites through the individual GPS antennas of which positions are known in a 3-axis Cartesian coordinate system, and observes carrier phase differences between the radio signals received by the individual antennas. The system then establishes an antenna coordinate system by calculating relative positions of the GPS antennas from observables of the carrier phase differences and determines the heading and attitude of the mobile unit in a specific reference coordinate system (defined by users).

The conventional GPS attitude sensing system of this kind can determine the attitude of the mobile unit by receiving a radio signal from a GPS satellite. The GPS attitude sensing system however has a problem that, if the radio signal from the GPS satellite is interrupted or a cycle slip in carrier phase observation occurs, it becomes impossible to observe carrier phase differences, resulting in an inability to determine the attitude of the mobile unit.

One known approach to the solution of this problem is GPS/IMU integration technology, in which an inertial attitude sensing system observes motion of a mobile unit by use of inertia sensors (IMUs), such as angular velocity sensors or acceleration sensors, and the amount of rotation of the coordinate system, or an alignment angle for correcting misalignment between the attitude of the mobile unit obtained from inertial observations and the attitude of the mobile unit obtained by the GPS attitude sensing system, is estimated to determine the correct attitude of the mobile unit.

This conventional integration approach integrates attitude observations obtained by the inertial attitude sensing system and the GPS attitude sensing system to give high-precision attitude measurements in a stable fashion. To achieve this, the conventional integration approach involves a process of estimating an alignment angle between the attitude of the mobile unit represented in an inertial sensor coordinate system (IMU coordinate system) which is obtained by the inertia sensors mounted on the individual axes of a 3-axis Cartesian coordinate system and the attitude of the mobile unit represented in an antenna coordinate system which is obtained by the GPS attitude sensing system.

Using this conventional approach, it is possible to observe the motion of the mobile unit by the inertia sensors and uninterruptedly outputs data on the attitude of the mobile unit even when the radio signals from the GPS satellites are interrupted, because attitude observations, if any interrupted due to a loss of the radio signals, can be interpolated by the attitude obtained by the inertia sensors.

The aforementioned conventional GPS/IMU integration approach still has a problem to be solved, however, which is explained in the following.

In the conventional GPS/IMU integration approach, it is necessary to determine the amount of coordinate system rotation, that is, an inherent alignment angle for correcting misalignment between the antenna coordinate system and the IMU coordinate system, at the time of installation of the GPS antennas and the inertia sensors.

Conventionally, estimation of alignment angles is made by one of the following methods.

A first method of alignment angle estimation is such that multiple GPS antennas are installed while visually ensuring, for instance, that one reference direction (axis) of the IMU coordinate system of an inertial attitude sensing system including multiple inertia sensors matches one reference direction (axis) of the antenna coordinate system defined by the multiple GPS antennas. Then, disregarding misalignment which may occur between the two coordinate systems at installation, it is assumed that the two coordinate systems have been exactly matched.

In this first method, misalignment of a few degree could frequently occur between the two coordinate systems, so that attitude observations are inaccurate and unstable even when the GPS/IMU integration technology is used.

A second method of alignment angle estimation involves a process of estimating the alignment angle by the following method after setting the alignment angle by the aforementioned first method.

It is assumed in the following explanation that the inertial attitude sensing system employs angular velocity sensors, for example.

An angular velocity (hereinafter referred to as the GPS angular velocity) $\omega_{g1}$ is calculated from the attitude of the mobile unit obtained by the GPS attitude sensing system while, at the same time, an angular velocity (hereinafter referred to as the IMU angular velocity) $\omega_{i1}$ is determined by the angular velocity sensors. By taking a difference between the GPS angular velocity $\omega_{g1}$ and the IMU angular velocity $\omega_{i1}$, a difference value $\Delta_{z1}$ is obtained and an alignment angle $\theta_{i1}$ is estimated from the difference value $\Delta_{z1}$. The alignment angle $\theta_{i1}$ thus calculated is used to correct an IMU angular velocity $\omega_{i2}$ obtained in a succeeding measurement cycle. Then, taking a difference between the IMU angular velocity $\omega_{i2}$ and a GPS angular velocity $\omega_{g2}$ obtained at the same time, a new difference value $\Delta_{z2}$ is calculated, and from the difference value $\Delta_{z2}$ thus obtained, a new alignment angle $\theta_{i2}$ is estimated and used for correcting an IMU angular velocity obtained in a succeeding measurement cycle. This calculation cycle is repeated thereafter such that the alignment angle $\theta_i$ converges to a specific value, whereby a true alignment angle is obtained.

The alignment angle does not converge due to nonlinear property unless the alignment angle calculated as shown above is a small angle of a few degrees. Therefore, the alignment angle needs to be a small angle as an initial condition if the aforementioned method of alignment angle estimation is to be used.

If the GPS antennas are to be installed onboard by a user, for instance, the user must determine a GPS coordinate system (antenna coordinate system) on site and install the GPS antennas at precise positions in such a fashion that the GPS coordinate system substantially matches the IMU coordinate system. From a practical viewpoint, however, it is extremely difficult for the unskilled user to make sure that the GPS antennas are installed with a minor alignment angle between the GPS coordinate system and the IMU coordinate system. Furthermore, if the user can not visually check the locations of inertia sensors from installation sites of the GPS antennas, it is impossible to align the GPS coordinate system with the IMU coordinate system, so that it is absolutely difficult to minimize the alignment angle.

SUMMARY OF THE INVENTION

In light of the foregoing problems of the prior art, it is an object of the invention to provide an attitude sensing apparatus for determining the attitude of a mobile unit that can reliably estimate an alignment angle between a GPS antenna coordinate system and an IMU coordinate system with good accuracy regardless of the magnitude of the alignment angle.

According to a principal feature of the invention, an attitude sensing apparatus for determining the attitude of a mobile unit is provided with an alignment angle estimator and an alignment-angle adder. While cumulatively adding an alignment angle estimated at specific intervals and thereby updating the estimated alignment angle in sequence, the attitude sensing apparatus feeds back the estimated alignment angle for use in an alignment angle estimation process.

The alignment angle estimator including an inertia data converter and an alignment angle estimating section converts inertia data obtained by IMU inertia sensors from an IMU coordinate system to an antenna coordinate system.

The alignment angle estimating section estimates the alignment angle from the difference between the coordinate-converted inertia data and inertia data calculated from observations by a GPS attitude sensing system (hereinafter referred to as GPS inertia data) at the specific intervals.

The estimated alignment angle is cumulatively added and updated by the alignment angle adder at the aforementioned intervals and output to the inertia data converter. The inertia data converter coordinate-converts the inertia data using the updated alignment angle obtained at a particular point in time.

The alignment angle estimating section successively converts the inertia data using an alignment angle estimated from a difference value obtained at a particular point in time. Then, taking a difference between the inertia data thus converted and the GPS inertia data obtained at the same point in time as the converted inertia data, the alignment angle estimating section estimates a new alignment angle.

The estimated alignment angle at a particular point in time is estimated from the difference between the inertia data converted by using the alignment angle updated in a preceding estimation cycle and the GPS inertia data obtained at the same point in time by repeatedly performing the aforementioned feedback operation. Therefore, the value of the alignment angle estimated by the alignment angle estimating section gradually decreases and eventually approaches zero. At the same time, the updated alignment angle produced by the alignment angle adder gradually approaches its true value.

By using the alignment angle obtained by repeatedly performed estimation and cumulative adding operations in the aforementioned fashion, the attitude sensing apparatus of the invention integrates the attitude of the mobile unit determined in the antenna coordinate system and the attitude of the mobile unit determined in the IMU coordinate system and gives high-precision attitude measurements in a stable fashion.

According to the invention, GPS antennas are installed in such a manner that individual components $\theta_x$, $\theta_y$, $\theta_z$ of the alignment angle satisfy the conditions $-85° \leq \theta_x \leq 85°$, $-85° \leq \theta_y \leq 85°$ and $-85° \leq \theta_z \leq 90°$, and both the updated alignment angle and the estimated alignment angle are fed back for use in the alignment angle estimation process.

By installing the GPS antennas such that the individual components of the alignment angle fall within specific ranges and using both the updated alignment angle and the estimated alignment angle in the alignment angle estimation process in this way, it is possible to simplify algorithm of the alignment angle estimation process and increase processing speed for alignment angle estimation, without $C^g_i$ as initial values.

The attitude sensing apparatus of the invention further includes a sensor error adder and an inertia data correcting section to compensate for sensor errors contained in the inertia data output from the IMU inertia sensors.

The alignment angle estimator estimates the sensor errors from the difference in inertia data between the two attitude sensing systems and outputs the sensor errors to the sensor error adder. In the sensor error adder, the sensor errors are cumulatively added and updated at the specific intervals like the estimated alignment angle. The updated sensor errors are output to the inertia data correcting section, which corrects inertia data obtained in a succeeding measurement cycle by using the updated sensor errors.

According to the invention, it is also possible estimate an approximate alignment angle by visual observation, for instance, before execution of the aforementioned alignment angle estimation process and, using the alignment angle thus estimated, perform the alignment angle estimation process after setting initial values of a transformation matrix used by the alignment angle estimator.

Furthermore, since the alignment angle estimation process is performed until the alignment angle approaches a unique estimated value in this invention, it is possible to estimate the alignment angle in a reliable fashion.

These and other objects, features and advantages of the invention will become more apparent upon reading the following detailed description along with the accompanying drawings.

DETAILED DESCRIPTION OF THE PREFERRED EMBODIMENTS OF THE INVENTION

First Embodiment

Figure 1:
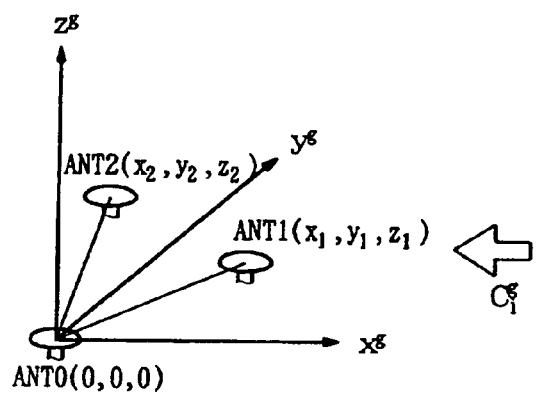
FIG. 1 is a diagram showing a relationship between an antenna coordinate system and an IMU coordinate system.
Figure 1:
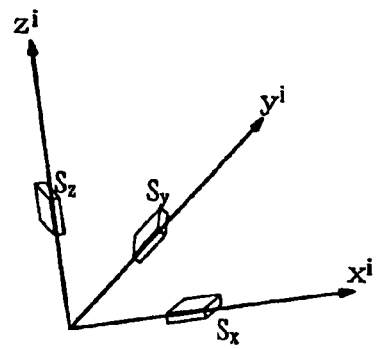
Figure 2:
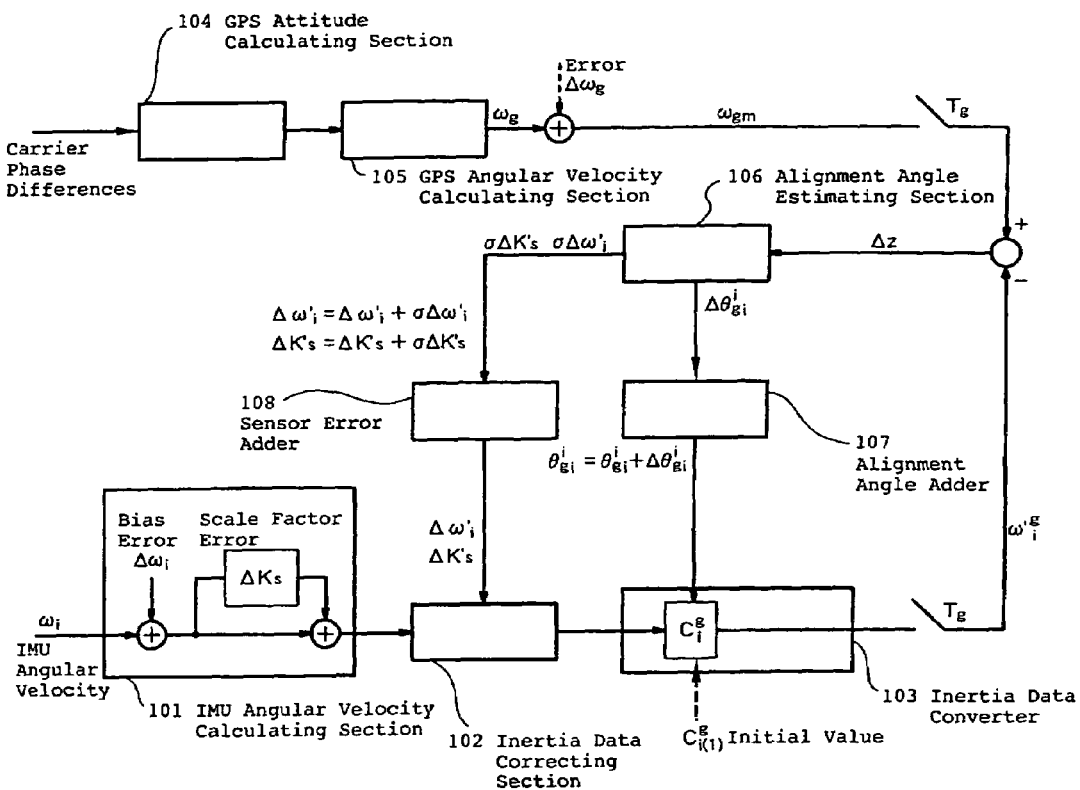
FIG. 2 is a block diagram of an attitude sensing apparatus according to a first embodiment of the invention particularly showing its alignment angle estimation process flow.

An attitude sensing apparatus for determining the attitude of a mobile unit according to a first embodiment of the invention is now described with reference to FIGS. 1 and 2, of which FIG. 1 is a diagram showing a relationship between an antenna coordinate system of a GPS attitude sensing system and an IMU coordinate system of an IMU attitude sensing system, and FIG. 2 is a block diagram of the attitude sensing apparatus of the first embodiment particularly showing its alignment angle estimation process flow.

Referring to FIG. 1, ANT0, ANT1 and ANT2 designate GPS antennas, $S_x$, $S_y$ and $S_z$ designate angular velocity sensors which are used as inertia sensors, $x^g$, $y^g$ and $z^g$ designate the antenna coordinate system, $x^i$, $y^i$ and $z^i$ designate the IMU coordinate system, and $C^g_i$ is a transformation matrix used for converting coordinates in the IMU coordinate system to corresponding coordinates in the antenna coordinate system.

Referring to FIG. 2, the reference numeral 101 designates an IMU angular velocity calculating section of the IMU attitude sensing system, the reference numeral 102 designates an inertia data correcting section, the reference numeral 103 designates an inertia data converter, the reference numeral 104 designates a GPS attitude calculating section of the GPS attitude sensing system, the reference numeral 105 designates a GPS angular velocity calculating section of the GPS attitude sensing system, the reference numeral 106 designates an alignment angle estimating section, the reference numeral 107 designates an alignment angle adder, and the reference numeral 108 designates a sensor error adder. The inertia data correcting section 102, the inertia data converter 103 and the alignment angle estimating section 106 together constitute an alignment angle estimator mentioned in the claims of this invention.

The three GPS antennas ANT0, ANT1, ANT2 are installed on the mobile unit in a manner that they are not arranged in a straight line as shown in FIG. 1. In the illustrated example, the GPS antenna ANT0 is located at the origin of the antenna coordinate system and the other two GPS antennas ANT1 and ANT2 are located at coordinates $(x_1, y_1, z_1)$ and $(x_2, y_2, z_2)$, respectively. The angular velocity sensors $S_x$, $S_y$, $S_z$ are mounted on the individual axes $x^g$, $y^g$, $z^g$ of the IMU coordinate system, respectively.

As depicted FIG. 1, the antenna coordinate system is rotated by a specific angle from the IMU coordinate system. Assuming that the coordinate system has been rotated about the z-, y- and x-axes in this order, and expressing Euler angles by $\theta_x$, $\theta_y$ and $\theta_z$, the transformation matrix $C^g_i$ is expressed as follows:

$$C^g_i = \begin{bmatrix} \cos\theta_y\sin\theta_z & \cos\theta_y\cos\theta_z & -\sin\theta_y \\ \sin\theta_x\sin\theta_y\cos\theta_z - \cos\theta_x\sin\theta_z & \sin\theta_x\sin\theta_y\sin\theta_z + \cos\theta_x\cos\theta_z & \sin\theta_x\cos\theta_y \\ \cos\theta_x\sin\theta_y\cos\theta_z + \sin\theta_x\sin\theta_z & \cos\theta_x\sin\theta_y\sin\theta_z - \sin\theta_x\cos\theta_z & \cos\theta_x\cos\theta_y \end{bmatrix} \quad (1)$$

where $\theta_x$, $\theta_y$ and $\theta_z$ in equation (1) above are x, y and z components of an alignment angle (hereinafter referred to as simply as the alignment angles of the individual axes).

The antenna coordinate system and the IMU coordinate system can be correlated with each other, or integrated, by estimating these alignment angles through calculation.

A method of alignment angle estimation is now described in detail with reference to FIG. 2. The angular velocity sensors $S_x$, $S_y$, $S_z$ are used as inertia sensors as already mentioned, and angular velocities measured by the angular velocity sensors $S_x$, $S_y$, $S_z$ (or IMU angular velocities) are used as inertia data in the following discussion of the embodiment.

The IMU angular velocity calculating section 101 includes the three angular velocity sensors $S_x$, $S_y$, $S_z$ mounted on the three axes $x^g$, $y^g$, $z^g$ of the 3-axis Cartesian IMU coordinate system shown in FIG. 1. Each of these angular velocity sensors $S_x$, $S_y$, $S_z$ outputs IMU angular velocity $\omega_{im}$ referenced to the IMU coordinate system. An IMU attitude angle calculator (not shown) determines an IMU attitude from the IMU angular velocity $\omega_{im}$ using a known method.

Each of these angular velocity sensors $S_x$, $S_y$, $S_z$ has as their inherent error factors a bias error $\Delta\omega_i$ and a scale factor error $\Delta K_s$. Therefore, the true value $\Delta\omega_i$ of the IMU angular velocity $\omega_{im}$ is given by equation (2) below:

$$\omega_{im} = \omega_i + \Delta\omega_i + (\omega_i + \Delta\omega_i)\Delta K_s \quad (2)$$

Assuming that the values of the terms of the second and higher power of the aforementioned error are negligible, the true value $\omega_i$ of the IMU angular velocity $\omega_{im}$ can be expressed as follows:

$$\omega_{im} \approx \omega_i + \Delta\omega_i + \omega_i \Delta K_s \quad (2')$$

Expressing the alignment angle for correcting misalignment of the IMU coordinate system with respect to the antenna coordinate system by $\Delta\theta^i_{gi}$, a transformation matrix $C'^g_i$ for correcting the misalignment is given by equation (3) below:

$$C'^g_i \approx [I - S(\Delta\theta^i_{gi})]C^g_i \quad (3)$$

where $C^g_i$ is the true transformation matrix shown in FIG. 1 and equation (1), $\Delta\theta^i_{gi}$ is a vector of which x, y and z components are $(\Delta\theta_x, \Delta\theta_y, \Delta\theta_z)$, and $S(\Delta\theta^i_{gi})$ is an alternating matrix of the alignment angle $\Delta\theta^i_{gi}$ and expressed as follows:

$$S(\Delta\theta^i_{gi}) = \begin{bmatrix} 0 & -\Delta\theta^i_{giz} & \Delta\theta^i_{giy} \\ \Delta\theta^i_{giz} & 0 & -\Delta\theta^i_{gix} \\ -\Delta\theta^i_{giy} & \Delta\theta^i_{gix} & 0 \end{bmatrix} \quad (4)$$

The inertia data converter 103 converts the IMU angular velocity $\omega_{im}$ from the IMU coordinate system to the antenna coordinate system using the aforementioned equation (1).

Disregarding the terms of the second and higher power of the error, IMU/GPS angular velocity $\omega'^g_i$ obtained by converting the IMU angular velocity $\omega_{im}$ from the IMU coordinate system to the antenna coordinate system is expressed as follows from equations (2') and (3):

$$\omega'^g_i = C'^g_i \omega_{im} = [I - S(\Delta\theta^i_{gi})]C^g_i(\omega_i + \Delta\omega_i + \omega_i \Delta K_s) \qquad (5)$$
$$\approx C^g_i \omega_i + C^g_i \Delta\omega_i + C^g_i \omega_i \Delta K_s - S(\Delta\theta^i_{gi})C^g_i \omega_i$$

On the other hand, the GPS attitude calculating section 104 receives radio signals from GPS satellites through the GPS antennas ANT0, ANT1, ANT2 shown in FIG. 1 and outputs a GPS attitude using a known method. Using this GPS attitude, the GPS angular velocity calculating section 105 calculates and outputs a GPS angular velocity $\omega_{gm}$. Since the actually observed GPS angular velocity $\omega_{gm}$ contains an error $\Delta\omega_g$, the true value $\omega_g$ of the GPS angular velocity $\omega_{gm}$ is given by equation (6) below:

$$\omega_{gm} = \omega_g + \Delta\omega_g \qquad (6)$$

Here, there is a relationship expressed by equation (7) below between the true value $\omega_g$ of the GPS angular velocity $\omega_{gm}$ and the true value $\omega_i$ of the IMU angular velocity $\omega_{im}$:

$$\omega_g = C^g_i \omega_i \qquad (7)$$

From equations (5), (6) and (7), the difference $\Delta z$ between the IMU/GPS angular velocity $\omega'^g_i$ and the GPS angular velocity $\omega_{gm}$ is expressed by equation (8) below:

$$\Delta z = \omega_{gm} - \omega'^g_i \approx -\omega'^g_i \Delta\theta^i_{gi} - C^g_i \Delta\omega_i - \omega'^g_i \Delta K_s + \Delta\omega_g \qquad (8)$$
$$= HX + v$$

where (9)

$$H = \begin{bmatrix} 0 & \omega'^g_{iz} & -\omega'^g_{iy} & -C^g_i(1,1) & -C^g_i(1,2) & -C^g_i(1,3) & -\omega'^g_{ix} & 0 & 0 \\ -\omega'^g_{iz} & 0 & \omega'^g_{ix} & -C^g_i(2,1) & -C^g_i(2,2) & -C^g_i(2,3) & 0 & -\omega'^g_{iy} & 0 \\ \omega'^g_{iy} & -\omega'^g_{ix} & 0 & -C^g_i(3,1) & -C^g_i(3,2) & -C^g_i(3,3) & 0 & 0 & -\omega'^g_{iz} \end{bmatrix}$$

and (10)

$$X = \begin{bmatrix} \Delta\theta^i_{gix} \\ \Delta\theta^i_{giy} \\ \Delta\theta^i_{giz} \\ \Delta\omega'_x \\ \Delta\omega'_y \\ \Delta\omega'_z \\ \Delta K'_{sx} \\ \Delta K'_{sy} \\ \Delta K'_{sz} \end{bmatrix}$$

where $\Delta\theta^i_{gix}$, $\Delta\theta^i_{giy}$, and $\Delta\theta^i_{giz}$ are alignment angles, $\Delta\omega'_x$, $\Delta\omega'_y$ and $\Delta\omega'_z$ are estimated bias errors of the angular velocities measured by the angular velocity sensors $S_x$, $S_y$, $S_z$ mounted on the z-, y- and x-axes of the IMU coordinate system, $\Delta K'_{sx}$, $\Delta K'_{sy}$ and $\Delta K'_{sz}$ are estimated scale factor errors of the angular velocities measured by the angular velocity sensors $S_x$, $S_y$, $S_z$ mounted on the z-, y- and x-axes of the IMU coordinate system, and $v$ is an observation error of the difference $\Delta z$ between the IMU/GPS angular velocity $\omega'^g_i$ and the GPS angular velocity $\omega_{gm}$, respectively.

The IMU/GPS angular velocity $\omega'^g_i$ and the GPS angular velocity $\omega_{gm}$ are individually sampled at intervals of Tg and processed in synchronism with each other such that the IMU/GPS angular velocity $\omega'^g_i$ and the GPS angular velocity $\omega_{gm}$ observed at the same time are processed together.

The alignment angle estimating section 106 receives the difference $\Delta z$ between the IMU/GPS angular velocity $\omega'^g_i$ and the GPS angular velocity $\omega_{gm}$ and estimates state variables of equation (10) above.

For example, the alignment angle estimating section 106 estimates the individual state variables during each successive sampling period Tg by using a Kalman filter represented by equation (11) below:

$$X(k+1) = \Phi X(k) + w_k \qquad (11)$$

where $\Phi$ is a state transition matrix, and $w_k = (0, 0, 0, \eta x, \eta y, \eta z, 0, 0, 0)^T$ represents observation noise.

The Kalman filter calculates estimated errors of a current estimation cycle from those of a preceding estimation cycle at specific intervals in such a manner that the mean square error of the estimated errors is minimized. The Kalman filter repeatedly performs this operation to determine a desired output.

Provided that the estimated bias error $\Delta\omega'_i$ is $\delta\Delta\omega'_i$ and the estimated scale factor error $\Delta K'_s$ is $\delta\Delta K'_s$ at a given point in time, the estimated bias error $\delta\Delta\omega'_i$ and the estimated scale factor error $\delta\Delta K'_s$ are input to the sensor error adder 108.

The sensor error adder 108 then adds the estimated bias error $\delta\Delta\omega'_i$ and the estimated scale factor error $\delta\Delta K'_s$ to the estimated bias error $\Delta\omega'_i$ and the estimated scale factor error $\Delta K'_s$ of the preceding estimation cycle as shown by equations (12) below:

$$\Delta\omega'_i = \Delta\omega'_i + \delta\Delta\omega'_i$$

$$\Delta K'_s = \Delta K'_s + \delta\Delta K'_s \qquad (12)$$

The aforementioned mathematical operation is performed at the intervals of Tg, each time $\delta\Delta\omega'_i$ and $\delta\Delta K'_s$ are estimated. Both the estimated bias error $\Delta\omega'_i$ and the estimated scale factor error $\Delta K'_s$ are updated by cumulatively adding their values over the successive sampling periods Tg.

The updated estimated bias error $\Delta\omega'_i$ and estimated scale factor error $\Delta K'_s$ are output to the inertia data correcting section 102. Then, the inertia data correcting section 102 corrects the IMU angular velocity $\omega_{im}$ obtained in a succeeding measurement cycle using the updated estimated bias error $\Delta\omega'_i$ and estimated scale factor error $\Delta K'_s$.

By feeding back the estimated bias error $\Delta\omega'_i$ and the estimated scale factor error $\Delta K'_s$ in the aforementioned fashion, sensor errors $\delta\Delta\omega'_i$ and $\delta\Delta K'_s$ estimated by the alignment angle estimating section 106 at a particular point in time are determined from the IMU angular velocity corrected by the estimated value of a preceding estimation cycle and the GPS angular velocity of a current estimation cycle. As a consequence, the sensor errors estimated by the alignment angle estimating section 106 gradually decrease each time they are updated and eventually approach zero. On the other hand, the sensor error adder 108 cumulatively adds the sensor errors which are estimated time-sequentially so that the sensor errors gradually approach their true values.

The sensor errors gradually approach the true values as they are repeatedly estimated in the aforementioned manner. The IMU angular velocity is corrected by using such sensor errors to gradually exclude the influence of the sensor errors with respect to IMU angular velocity measurement.

The alignment angle adder 107 cumulatively adds the alignment angle $\Delta\theta^i_{gi}$ estimated by the alignment angle estimating section 106 over the successive sampling periods Tg and generates an updated alignment angle $\theta^i_{gi}$ as shown by equation (13) below:

$$\theta^i_{gi} = \theta^i_{gi} + \Delta\theta^i_{gi} \quad (13)$$

The updated alignment angle $\theta^i_{gi}$ is output to the inertia data converter 103, which sequentially calculates and updates the transformation matrix $C^g_i$ shown in equation (1) using the updated alignment angle $\theta^i_{gi}$.

By feeding back the updated alignment angle $\theta^i_{gi}$ in this fashion, the alignment angle $\Delta\theta^i_{gi}$ estimated at a particular point in time is determined from the difference between the IMU angular velocity coordinate-converted by using the updated alignment angle $\theta^i_{gi}$ of a preceding estimation cycle and the GPS angular velocity obtained in the same estimation cycle. As a consequence, the alignment angle $\Delta\theta^i_{gi}$ estimated by the alignment angle estimating section 106 gradually decreases and eventually approach zero, and the estimated alignment angle $\Delta\theta^i_{gi}$ gradually approaches its true value.

Figure 3:
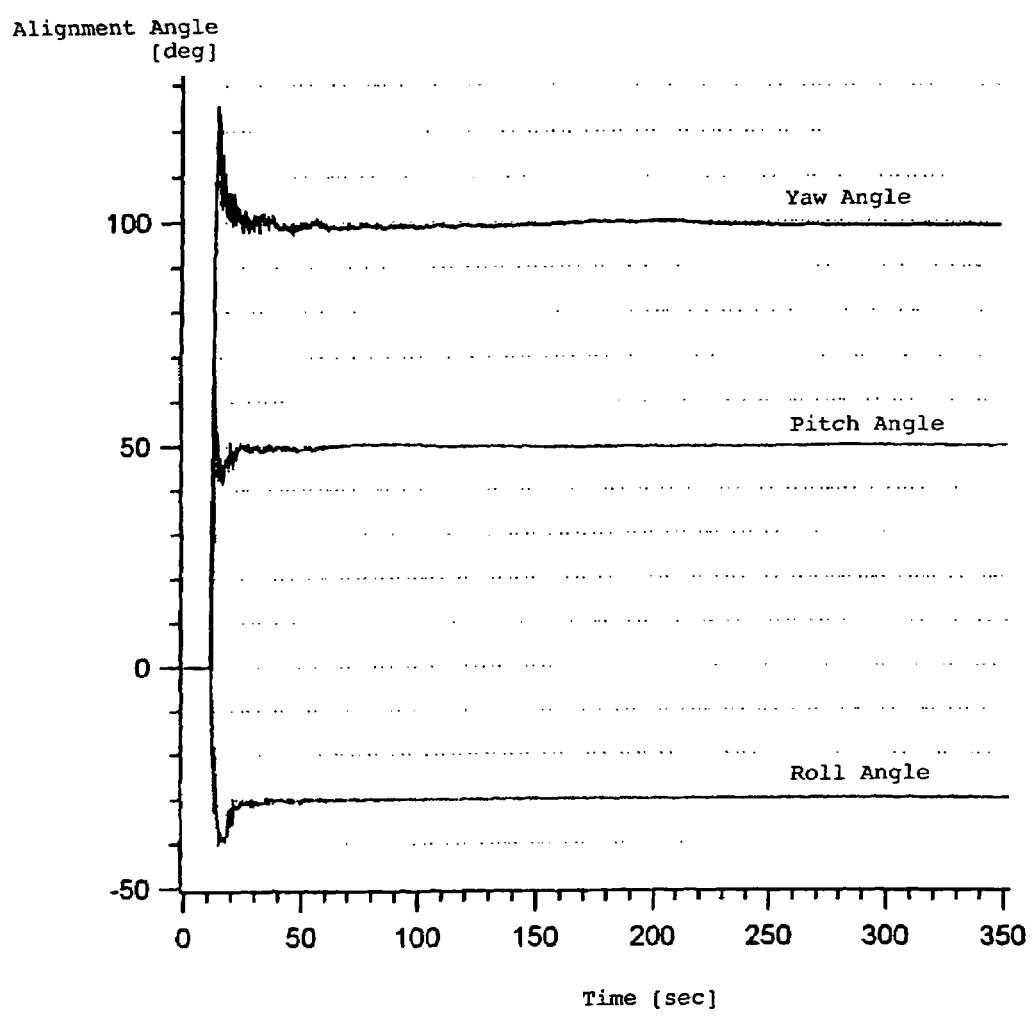
FIG. 3 is a graphical representation of the result of simulation of alignment angle estimation.

FIG. 3 shows the result of simulation of alignment angle estimation.

For the purpose of simulation, alignment angle estimation was made on condition that the individual components of the alignment angle between the antenna coordinate system and the IMU coordinate system corresponded to roll angle, pitch angle and yaw angle of the mobile unit, which were assumed to be 30°, 50° and 100°, respectively, their initial values of estimation being 0°, and white noise was superimposed. Also, the amplitudes and periods of the roll angle, pitch angle and yaw angle, which were used as conditions for estimating the alignment angle here, were set as shown in Table 1 below.

TABLE 1

| Component of alignment angle | Amplitude | Period |
|---|---|---|
| Roll angle | 4° | 4 sec |
| Pitch angle | 4° | 4 sec |
| Yaw angle | 30° | 15 sec |

Although the individual components of the alignment angle oscillate in an initial stage of estimation due to the influence of the white noise, for instance, the oscillation gradually diminish and the components of the alignment angle approach their true values as shown in FIG. 3.

Figure 4:
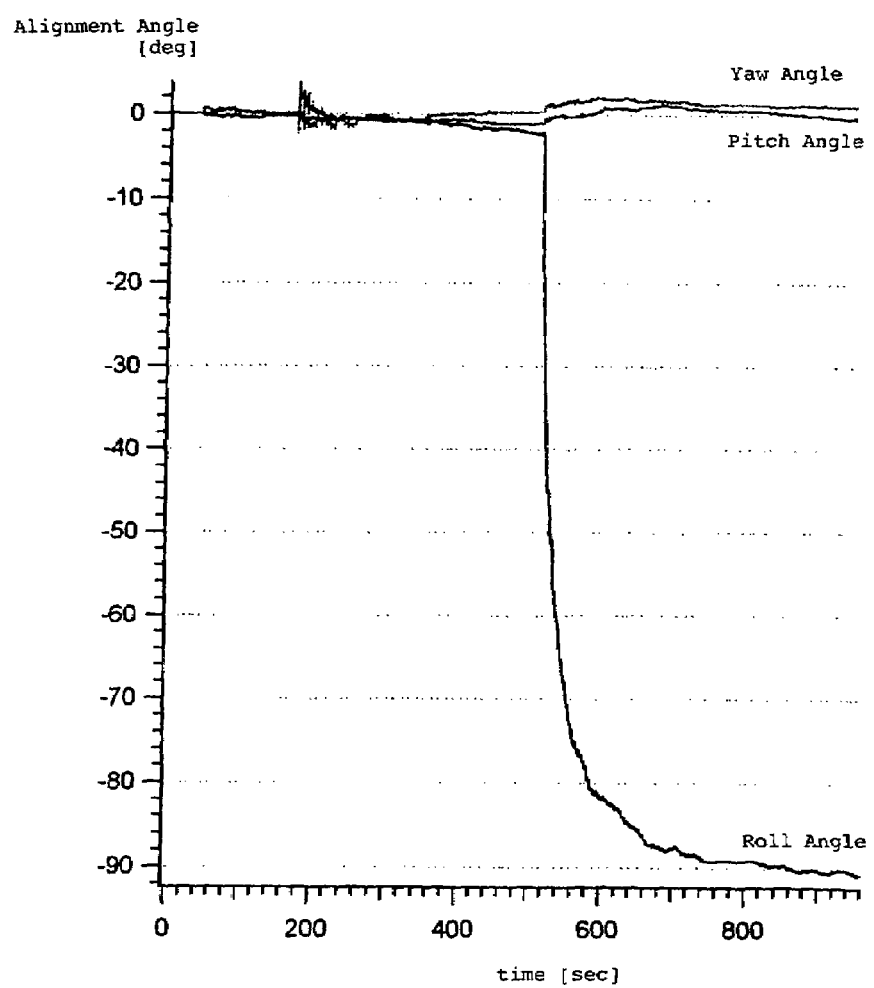
FIG. 4 is a graphical representation of the result of simulation of alignment angle estimation performed on an actual vessel.

FIG. 4 shows the result of estimation of alignment angles derived from angular velocities obtained by the angular velocity sensors $S_x$, $S_y$, $S_z$ and the GPS antennas ANT0, ANT1, ANT2 installed on a swing motion testing facility. In this experimental testing of estimation, two coordinate systems (for the IMU attitude sensing system and the GPS attitude sensing system) were set up such that the roll angle was −90° and the yaw angle and pitch angle were 0°. Also, yawing and pitching were started 180 seconds after the beginning of testing, and rolling was started 500 seconds after the beginning of testing as swinging conditions of IMU unit.

As shown in FIG. 4, the individual components of the alignment angle approach to values within a range of errors of approximately 1°. This indicates that the alignment angles can be estimated in a reliable fashion by using the aforementioned alignment angle estimation method no matter how large the alignment angles may be.

The alignment angles for correcting misalignment between the antenna coordinate system and the IMU coordinate system can be precisely determined as seen above by the aforementioned method. This means that the attitude of the mobile unit determined by the GPS attitude sensing system and the attitude of the mobile unit determined by the IMU attitude sensing system can be correlated with each other, or integrated, with high precision by the invention. In short, the invention makes it possible to continuously determine the attitude of the mobile unit with high precision in a manner unaffected by external conditions.

In the aforementioned simulation, the initial values of the individual state variables in the inertia data correcting section 102, the inertia data converter 103, the alignment angle adder 107 and the sensor error adder 108 are set to all zeroes and the initial value of the transformation matrix $C^g_i$ is assumed to be a unit matrix.

While estimation of the individual state variables are done by using the Kalman filter in the present embodiment, it is also possible to store as many differences $\Delta z$ as necessary for calculating the individual state variables and calculate the state variables from these differences $\Delta z$ using the least squares method. In this case, however, it is to be noted that update intervals of the individual state variables become equal to the sampling intervals Tg multiplied by the number of the differences $\Delta z$ necessary for calculating the state variables.

In addition, although the alignment angles are estimated taking into account the sensor errors and the scale factor error in the foregoing embodiment, it is also possible to estimate the alignment angles by using high-precision angular velocity sensors or, depending on required accuracy of the alignment angle estimation, by neglecting the aforementioned state variables.

Second Embodiment

An attitude sensing apparatus for determining the attitude of a mobile unit according to a second embodiment of the invention is now described with reference to FIG. 5.

Figure 5:
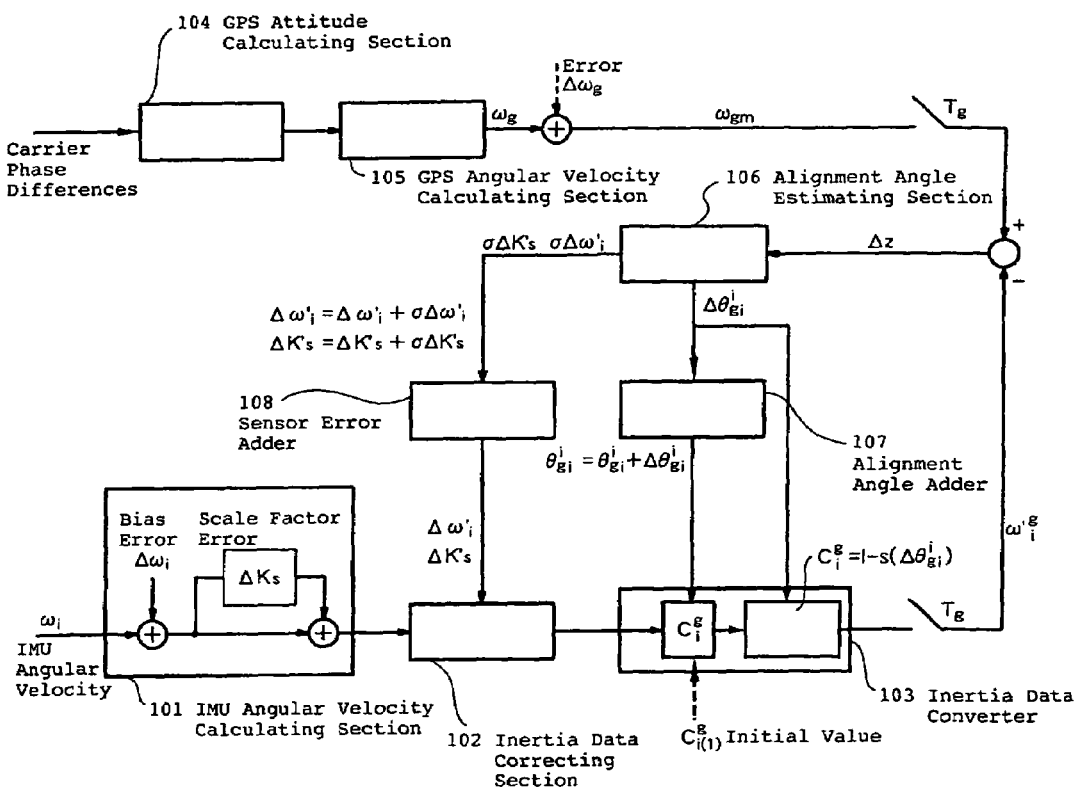
FIG. 5 is a block diagram of an attitude sensing apparatus according to a second embodiment of the invention particularly showing its alignment angle estimation process flow.

FIG. 5 is a block diagram of the attitude sensing apparatus of the second embodiment particularly showing its alignment angle estimation process flow.

Although the attitude sensing apparatus of FIG. 5 has the same configuration including the same circuit elements as the attitude sensing apparatus of FIG. 2, the inertia data converter 103 of FIG. 5 performs a different mathematical operation compared to the attitude sensing apparatus of FIG. 2 in converting IMU angular velocities referenced to the IMU coordinate system to GPS angular velocities referenced to the antenna coordinate system. Specifically, the estimated alignment angle $\Delta\theta^i_{gi}$ is fed back to the inertia data converter 103 together with the updated alignment angle $\theta^i_{gi}$.

Transformation matrix $C^g_i$ must be approximated by a unit matrix when the transformation matrix $C^g_i$ is unknown, because the transformation matrix $C^g_i$ is necessary to be known to use the equation (8) based on the equation (3). For this purpose, the individual components $\theta_x$, $\theta_y$, $\theta_z$ of the alignment angle constituting individual elements of the transformation matrix $C^g_i$ are set to satisfy the following conditions:

$$-85° \leq \theta^i_{gix} \leq 85°,$$

$$-85° \leq \theta^i_{giy} \leq 85°,$$

$$-85° \leq \theta^i_{giz} \leq 90° \quad (14)$$

These conditions can be easily met by visually checking the arrangement of the IMU coordinate system and the antenna coordinate system.

It is possible to approximate the transformation matrix $C^g_i$ shown in equations (8) and (9) by a unit matrix with the alignment angles in the aforementioned ranges, whereby equations (8) and (9) are expressed by the following equations, respectively:

$$\Delta z = \omega_{gm} - \omega_i'^g \approx -\omega_i'^g \Delta \theta^1_{gi} - \Delta\omega_i - \omega_i'^g \Delta K_s + \Delta\omega_g \quad (15)$$
$$= HX + v$$

$$H = \begin{bmatrix} 0 & \omega_{iz}'^g & -\omega_{iy}'^g & -1 & 0 & 0 & -\omega_{ix}'^g & 0 & 0 \\ -\omega_{iz}'^g & 0 & \omega_{ix}'^g & 0 & -1 & 0 & 0 & -\omega_{iy}'^g & 0 \\ \omega_{iy}'^g & -\omega_{ix}'^g & 0 & 0 & 0 & -1 & 0 & 0 & -\omega_{iz}'^g \end{bmatrix} \quad (16)$$

When the conditions expressed by inequalities (14) above are applied to the above equations, a maximum of only one element of the actual transformation matrix $C'g_i$ calculated with the equation (3) by $C^g_i$ as the unit matrix has a sign (plus or minus) differing from the corresponding element of the true transformation matrix $C^g_i$ among their all elements.

When the alignment angle is converted from the IMU coordinate system to the antenna coordinate system by using the actual transformation matrix $C'^g_i$, the magnitude of the IMU/GPS angular velocity $\omega'g_i$ would change. However, a change in the plus/minus sign occurs in only one of x, y and z components $\omega'^g_{ix}$, $\omega'^g_{iy}$, $\omega'^g_{iz}$ of the IMU/GPS angular velocity $\omega'^g_i$.

In case that two components of angle velocity $\omega'^g_i$ have unreversed plus/minus signs, the estimated alignment angle $\Delta\theta^i_{gi}$ is calculated in such a way that it approaches a true value. If the estimated alignment angle $\Delta\theta^i_{gi}$ thus calculated is cumulatively added in sequence and fed back for the conversion of the angular velocity, the plus/minus sign of the one element of the transformation matrix $C'^g_i$ having the reversed plus/minus sign is reversed again so that the estimated alignment angle $\Delta\theta^i_{gi}$ approaches its true value. Since the elements are corrected in this fashion, the true transformation matrix $C^g_i$ can be substituted for the transformation matrix $C'^g_i$, making it possible to exactly estimate the alignment angle.

Since the transformation matrix $C^g_i$ can be approximated by the unit matrix as stated above by setting the elements of the transformation matrix $C^g_i$ to satisfy the conditions expressed by inequalities (14), it is possible to simplify algorithm of mathematical operation and reduce the time required for estimation.

When the alignment angle is considerably large not to be satisfied with the inequalities (14), it is possible to reduce the estimation time by presetting initial values $C^g_{i(1)}$ of the transformation matrix $C^g_i$ of the inertia data converter 103 to satisfy the conditions of inequalities (14) as shown in FIG. 5.

In the foregoing embodiments of the invention, operation for estimating the alignment angle is performed until the alignment angle approaches a correct estimated value, so that the alignment angle can be estimated in a reliable fashion according to the invention.

Additional Features

According to the invention, an estimated alignment angle is cumulatively added and updated at specific intervals of estimation and the updated alignment angle is fed back for use in alignment angle estimation process. Since a new alignment angle is estimated at the same estimation intervals from inertia data converted by the alignment angle which was updated in a preceding estimation cycle, the alignment angle successively estimated at the estimation intervals gradually decreases and eventually approaches zero. By performing such feedback operation in the alignment angle estimation process, it is possible to reliably estimate an accurate alignment angle regardless particularly of the magnitude of an initial alignment angle.

According to the invention, it is possible to simplify algorithm of the alignment angle estimation process and reduce the time required for alignment angle estimation by setting an initial value of the alignment angle falling within a specific range.

According to the invention, it is also possible to exclude sensor errors contained in the estimated alignment angle by feeding back the successively estimated and cumulatively added sensor errors. With this operation, it is possible to cause the updated alignment angle obtained by cumulatively adding the alignment angle estimated over the successive estimation intervals to approach a true value with yet higher accuracy.

Furthermore, the invention makes it possible to reliably estimate the alignment angle in the alignment angle estimation process and further reduce the time required for alignment angle estimation by setting an initial value of the alignment angle obtained by visual observation, for instance, before execution of the alignment angle estimation process.

Moreover, since the alignment angle estimation process is performed until the alignment angle approaches a correct estimated value in this invention, it is possible to estimate the alignment angle in a reliable fashion.

What is claimed is:

1. An attitude sensing apparatus having a GPS attitude sensing system which determines the attitude of a mobile unit in an antenna coordinate system and an IMU attitude sensing system which determines the attitude of the mobile unit in an IMU coordinate system, and further determining the attitude of the mobile unit by integrating the attitudes of the mobile unit determined in the antenna coordinate system and the IMU system, said attitude sensing apparatus comprising:

an alignment angle estimator for successively estimating an alignment angle to be used in a succeeding calculation process based on the difference between GPS data calculated from observations by said GPS attitude sensing system and inertia data observed by said IMU attitude sensing system; and an alignment angle adder for generating an updated alignment angle by cumulatively adding the successively estimated alignment angle and thereby sequentially updating the estimated alignment angle and for outputting the updated alignment angle to said alignment angle estimator;

wherein the estimated alignment angle is successively fed back for use in the alignment angle estimation process.

2. The attitude sensing apparatus according to claim 1, wherein individual components $\theta_x, \theta_y, \theta_z$ of the alignment angle satisfy the following conditions:

$$-85° \leq \theta_x \leq 85°,$$

$$-85° \leq \theta_y \leq 85°,$$

$$-85° \leq \theta_z \leq 90°$$

and the estimated alignment angle is successively fed back together with the updated alignment angle for use in the alignment angle estimation process.

3. The attitude sensing apparatus according to claim 1 or 2, wherein said alignment angle estimator successively estimates a sensor error caused by an inertia sensor of said IMU attitude sensing system from the estimated alignment angle, said attitude sensing apparatus further comprising:

a sensor error adder for generating an updated sensor error by cumulatively adding the successively estimated sensor error and thereby updating the estimated sensor error in sequence and for outputting the updated sensor error to said alignment angle estimator;

wherein the updated sensor error is successively fed back for use in the alignment angle estimation process.

4. The attitude sensing apparatus according to claim 1 further comprising:

a setter for setting a provisional alignment angle upon installation of a GPS antenna of said GPS attitude sensing system and an inertia sensor of said IMU attitude sensing system;

wherein initial conditions for said alignment angle estimator are set by using the provisional alignment angle.

5. The attitude sensing apparatus according to claim 1, wherein the alignment angle estimation process is performed until the alignment angle is finally determined.

6. An attitude sensing apparatus for determining the attitude of a mobile unit, comprising:

a GPS attitude sensing system which determines the attitude of the mobile unit in a GPS coordinate system;

an IMU attitude sensing system which determines the attitude of the mobile unit in an IMU coordinate system;

an alignment angle estimator for successively estimating an alignment angle to be used in a succeeding calculation process based on the difference between inertia data calculated from observations by said GPS attitude sensing system and inertia data observed by said IMU attitude sensing system; and an alignment angle adder for generating an updated alignment angle by cumulatively adding the successively estimated alignment angle and thereby sequentially updating the estimated alignment angle and for outputting the updated alignment angle to said alignment angle estimator;

wherein the estimated alignment angle is successively fed back for use in the alignment angle estimation process.

7. The attitude sensing apparatus according to claim 6, wherein individual components $\theta_x, \theta_y, \theta_z$ of the alignment angle satisfy the following conditions:

$$-85° \leq \theta_x \leq 85°,$$

$$-85° \leq \theta_y \leq 85°,$$

$$-85° \leq \theta_z \leq 90°,$$

and the estimated alignment angle is successively fed back together with the updated alignment angle for use in the alignment angle estimation process.

8. The attitude sensing apparatus according to claim 6 or 7, wherein said alignment angle estimator successively estimates a sensor error caused by an inertia sensor of said IMU attitude sensing system from the estimated alignment angle, said attitude sensing apparatus further comprising:

a sensor error adder for generating an updated sensor error by cumulatively adding the successively estimated sensor error and thereby updating the estimated sensor error in sequence and for outputting the updated sensor error to said alignment angle estimator;

wherein the updated sensor error is successively fed back for use in the alignment angle estimation process.

9. The attitude sensing apparatus according to claim 6 further comprising:

a setter for setting a provisional alignment angle upon installation of a GPS antenna of said GPS attitude sensing system and an inertia sensor of said IMU attitude sensing system;

wherein initial conditions for said alignment angle estimator are set by using the provisional alignment angle.

10. The attitude sensing apparatus according to claim 6, wherein the alignment angle estimation process is performed until the alignment angle is finally determined.

11. A method for attitude sensing including a GPS attitude sensing system which determines the attitude of a mobile unit in an antenna coordinate system and an IMU attitude sensing system which determines the attitude of the mobile unit in an IMU coordinate system and determining the attitude of the mobile unit by integrating the attitudes of the mobile unit determined in the antenna coordinate system and the IMU coordinate system, said method comprising:

estimating successively an alignment angle to be used in a succeeding calculation process based on the difference between inertia data calculated from observations by said GPS attitude sensing system and inertia data observed by said IMU attitude sensing system; and generating an updated alignment angle based on the estimated alignment angle, which is fed back for use in the alignment angle estimation process.

12. The attitude sensing method according to claim 11, wherein individual components $\theta_x$, $\theta_y$, $\theta_z$ of the alignment angle satisfy the following conditions:

$$-85° \leq \theta_x \leq 85°,$$

$$-85° \leq \theta_y \leq 85°,$$

$$-85° \leq \theta_z \leq 90°$$

and the estimated alignment angle is successively fed back together with the updated alignment angle for use in the alignment angle estimation process.

13. The attitude sensing method according to claim 11 or 12, wherein there are successive estimates of a sensor error caused by an inertia sensor of said IMU attitude sensing system from the estimated alignment angle, said method further comprising:
   generating an updated sensor error by cumulatively adding the successively estimated sensor error and thereby updating the estimated sensor error in sequence and outputting the updated sensor error;
   wherein the updated sensor error is successively fed back for use in the alignment angle estimation process.

14. The attitude sensing method according to claim 11 further comprising:
   setting a provisional alignment angle upon installation of a GPS antenna of said GPS attitude sensing system and an inertia sensor of said IMU attitude sensing system;
   wherein initial conditions for said alignment angle estimator are set by using the provisional alignment angle.

15. The attitude sensing method according to claim 11, wherein the alignment angle estimation process is performed until the alignment angle is finally determined.

16. An attitude sensing method for determining the attitude of a mobile unit, comprising:
   determining the attitude of the mobile unit in an antenna coordinate system with a GPS attitude sensing system;
   determining the attitude of the mobile unit in an IMU coordinate system with an IMU attitude sensing system;
   estimating successively an alignment angle to be used in a succeeding calculation process based on the difference between inertia data calculated from observations by said GPS attitude sensing system and inertia data observed by said IMU attitude sensing system; and
   generating an updated alignment angle by cumulatively adding the successively estimated alignment angle and thereby sequentially updating the estimated alignment angle and for outputting the updated alignment angle to said alignment angle estimator;
   wherein the estimated alignment angle is successively fed back for use in the alignment angle estimation process.

17. The attitude sensing method according to claim 16, wherein individual components $\theta_x$, $\theta_y$, $\theta_z$ of the alignment angle satisfy the following conditions:

$$-85° \leq \theta_x \leq 85°,$$

$$-85° \leq \theta_y \leq 85°,$$

$$-85° \leq \theta_z \leq 90°$$

and the estimated alignment angle is successively fed back together with the updated alignment angle for use in the alignment angle estimation process.

18. The attitude sensing method according to claim 16 or 17, wherein there are successive estimates of a sensor error caused by an inertia sensor of said IMU attitude sensing system from the estimated alignment angle, said attitude sensing method further comprising:
   generating an updated sensor error by cumulatively adding the successively estimated sensor error and thereby sequentially updating the estimated sensor error and for outputting the updated sensor error;
   wherein the updated sensor error is successively fed back for use in the alignment angle estimation process.

19. The attitude sensing method according to claim 16 further comprising:
   setting a provisional alignment angle upon installation of a GPS antenna of said GPS attitude sensing system and an inertia sensor of said IMU attitude sensing system;
   wherein initial conditions for said alignment angle estimator are set by using the provisional alignment angle.

20. The attitude sensing method according to claim 16, wherein the alignment angle estimation process is performed until the alignment angle is finally determined.

21. The attitude sensing method according to claim 11, further comprising:
   generating an updated alignment angle by cumulatively adding the successively estimated alignment angle and thereby sequentially updating the estimated alignment angle and for outputting the updated alignment angle to said alignment angle estimator, wherein the estimated alignment angle is successively fed back for use in the alignment angle estimation process.

* * * * *